United States Patent [19]
Landgrebe

[11] Patent Number: 5,704,749
[45] Date of Patent: Jan. 6, 1998

[54] PANEL ALIGNING FASTENING SYSTEM

[75] Inventor: James H. Landgrebe, Fort Worth, Tex.

[73] Assignee: Lockheed Martin Corporation, Fort Worth, Tex.

[21] Appl. No.: 685,452

[22] Filed: Jul. 19, 1996

[51] Int. Cl.$^6$ ............................................. F16B 35/00
[52] U.S. Cl. .................. 411/366; 411/339; 411/386; 411/411
[58] Field of Search ........................... 411/366, 349, 411/338, 339, 386, 399, 411

[56] References Cited

U.S. PATENT DOCUMENTS

| | | | |
|---|---|---|---|
| 1,909,941 | 5/1933 | Finch | 411/338 |
| 2,798,404 | 7/1957 | Schaefer et al. | |
| 3,304,109 | 2/1967 | Schuster | |
| 3,462,114 | 8/1969 | O'Dell | 411/339 |
| 3,821,871 | 7/1974 | Schmitt | |
| 4,016,703 | 4/1977 | Champoux et al. | |
| 5,024,051 | 6/1991 | Glass | 411/366 |
| 5,104,272 | 4/1992 | Dupont | 411/339 |
| 5,374,146 | 12/1994 | Allen | 411/386 |

*Primary Examiner*—Flemming Saether
*Attorney, Agent, or Firm*—James E. Bradley

[57] ABSTRACT

A fastener assembly having a receptacle attached to the underside of a substructure and extending through a hole within the substructure which are both generally aligned with a panel with a hole adapted to receive a threaded bolt. The hole in the panel has a cylindrical portion. The fastener extends through the panel which is being secured to the substructure and enters the receptacle before engaging a threaded section within the receptacle. The dimensions are sized so that the central section of the fastener engages the central section of the receptacle before the tapered section of the fastener contacts the cylindrical portion of the hole in the panel. Continued rotation of the fastener causes the tapered section on the fastener to enter the cylindrical portion of the hole in the panel, exerting a lateral force on the panel to align the hole in the panel with the bore in the receptacle.

15 Claims, 2 Drawing Sheets

PANEL ALIGNING FASTENING SYSTEM

This invention was made with Government support under Contract Number F33657-91-C-0006 awarded by The Department of the Air Force. The Government has certain rights in this invention.

BACKGROUND OF THE INVENTION

1. Field of the Invention

The present invention relates in general to a fastening system, and in particular to facilitating the alignment and installation of a panel for use in aircraft or the like.

2. Description of the Prior Art

A recurring problem in the field of this invention is to force alignment between misaligned parts without damage to fastener threads or to the assembled parts. For example, a structural arrangement comprising different types of material having varied coefficients of thermal expansion presents removal and reassembly problems when the surrounding environmental conditions, in particular temperature, deviate from specified engineering limits. Consequently, holes for inserting fasteners to reassemble parts may become misaligned when the temperature varies beyond specified ranges.

Numerous fastening systems have been utilized in an attempt to overcome this problem. Often, the hole is the substructure is oversized to accommodate misalignment. However, oversized holes greatly diminish the ability of the panel to carry structural loads, which can lead to premature failure of primary structure and panels. In addition, relative movement between the panel and structure can cause fasteners to cock and adversely impact aerodynamic smoothness. Relative movement between the panel and structure can contribute to fuel leaks. Aircraft loading can cause misalignment of panel/substructure holes, necessitating aircraft jacking in order to safely remove and install panels. Further, if the clearance between the bolt in the substructure on one side of the oversized hole is very tight, damage to the threads, panel or substructure may result during installation or removal.

Another approach is to use a sleevebolt which has a receptacle that includes a stud instead of a nut which necks down to provide some capability for forcing alignment. A wide range of nutplates and domenuts can be adhesively bonded to structure instead of being riveted. There are several problems with these prior art fastener systems.

First, these systems tend to cause cocking of the fastener. The head is thus not flush with the panel, which has an aerodynamic disadvantage. Second, these systems utilize several parts to achieve nut element "float" and are thus more complex. Third, where domenuts are used, intrusion into the inside volume is constant regardless of structural thickness. This adversely affects fuel volume and unnecessarily limits design options for routing tubing, cables, etc. The thicker the structure, the more difficult it is to drill rivet holes accurately and install rivets. Fifth, if structural thickness varies significantly, different length fasteners or heavy shims/spacers are required.

Other options and their associated weaknesses for controlling temperature in order to limit thermal expansion of parts include: the use of environmentally controlled hangars, which are very expensive and not always available; deferring maintenance until the ambient and aircraft temperature falls within the acceptable temperature range, which is operationally unacceptable; or using support equipment to locally heat or cool areas of the aircraft, which is expensive and operationally undesirable.

SUMMARY OF THE INVENTION

This invention consists of a threaded fastener and a receptacle that force alignment between misaligned parts without damage to the fastener threads or assembled parts. If the parts could be damaged by the aligning force generated by this fastening system, a grommet of appropriate design may be installed in the part.

The threaded fastener has a standard head, an unthreaded smooth grip, a transition chamfer, a smooth surface of smaller diameter, and a threaded length. The receptacle is a single piece and consists of a shear-load carrying area, a shear-load transfer area, a threaded section, a flange, an outer diameter, and shims of various thicknesses. The receptacle is normally installed so that the receiving end is flush with the surface of the structure in which it is installed.

DETAILED DESCRIPTION OF THE PREFERRED EMBODIMENT

Figure 1:
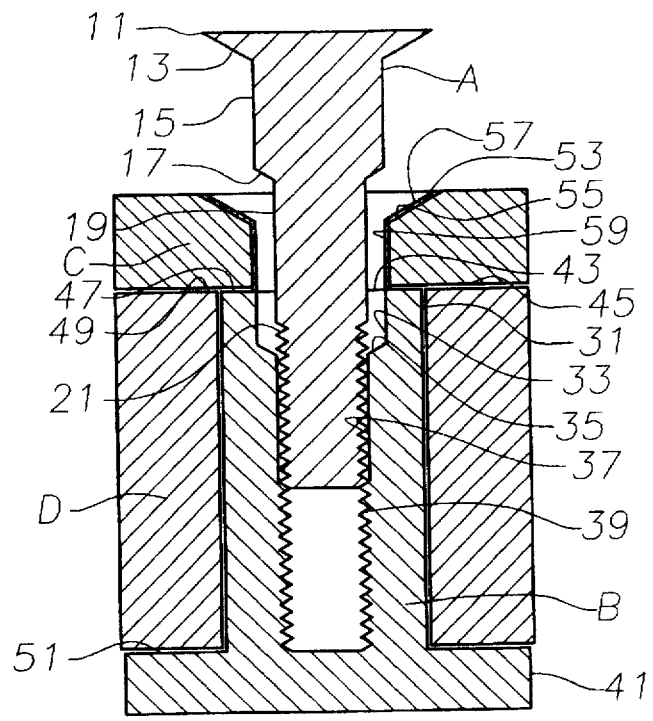
FIG. 1 is a sectional side view of the fastening system and the hardware that it is fastening at the initial fastening position.

FIG. 1 is a sectional side view of the fastening system which consists of a threaded fastener A and a receptacle B. In this view, the fastening system is used to facilitate the installation of misaligned air-craft panel C to structure D. The maximum misalignment between these parts is 0.015 inch.

Fastener A has a standard head 11 (e.g. hex or flush with a durable drive slot). Head 11 is flat on top and has a conical portion 13. Upper section 15 is an unthreaded cylindrical portion immediately below head 11, with a diameter of approximately 0.250 inches. The length of upper section 15 is greater than the thickness of panel C, which is approximately 0.200 inches. Upper section 15 carries shear loads when fastener A is fully installed. Tapered section 17 is a conical annular surface tapered at approximately 30 degrees toward the axis of fastener A. Tapered section 17 reduces the diameter of fastener A and converts the downward movement of fastener A to a lateral force. Central section 19 is smooth and cylindrical but has a smaller diameter and greater length than upper section 15. Central section 19 acts as a pivot point for the aligning lateral force. Tapered section 17 separates upper section 15 from central section 19. Threaded section 21 extends below central section 19 to the end of fastener A. Fastener A has an overall length of approximately one inch.

Receptacle B is essentially cylindrical with an outer diameter 31 greater than upper section 15. Receptacle B has a bore with four sections. Upper section 33 of receptacle B is a shear load carrying area for fastener A when it is fully installed. Upper section 33 is smooth and cylindrical and of substantially the same diameter and shorter length than fastener upper section 15. Tapered section 35 extends below upper section 33 at approximately 45 degrees, thereby reducing the diameter of receptacle B to a diameter slightly greater than that of fastener central section 19. Receptacle central section 37 is a shear load transfer area that extends below tapered section 35 for a length slightly less than that of central section 19. Central section 37 is cylindrical, acts as a fulcrum for the panel aligning force (if misalignment exists), and helps to prevent damage to both fastener A and threaded section 39, which extends below central section 37 for the rest of the length of receptacle B. Central section 37 is substantially the same diameter as fastener central section 19. Flange 41 is designed for attachment of receptacle B to structure D using adhesive or rivets (not shown). Flange 41 may be cylindrical with a diameter of approximately 0.75 inch and needs sufficient thickness to adequately support receptacle B when installed. Flange 41 is shown at the lower end of receptacle B, but may be installed at various points (not shown) along the length of receptacle B, depending upon the thickness of structure D.

Receptacle B is typically installed so that the open or receiving end 43 fits in a hole 45 in structure D, which is of slightly greater diameter than the outer diameter of receptacle B. The upper end 47 of receptacle B may be flush with upper surface 49 of structure D. Alternately, upper end 47 may protrude slightly above upper surface 49 and be surrounded by a compressible gasket. Assorted washer-type shims 51 may be installed, if required, between flange 41 and structure D to facilitate a flush mounting.

If panel C cannot react to alignment loads without sustaining damage, a compressible panel grommet 53 may be used to distribute the alignment forces and permit panel C to be forced into alignment without damage to either grommet 53 or panel C. For the purposes herein, grommet 53 is considered a part of panel C. Grommet 53 fits into a hole of panel C and has approximately the same length as the thickness of panel C. Grommet 53 has a hole 55 with a conical upper portion 57 that is tapered at the same angle as head tapered portion 13. The hole 55 of grommet 53 has a lower portion 59 that is cylindrical and substantially the same diameter as fastener upper section 15.

Materials and finishes are selected to be appropriate for the required usage. A lubricant (not shown) such as a dry film is specifically recommended on fastener upper section 15, tapered section 17, receptacle upper section 33, central section 37, hole 55, and grommet 53 (if used).

In FIG. 1, panel C is shown misaligned with structure D prior to installation. Receptacle B is shown installed in structure D beneath hole 55 in panel C. Fastener A is inserted through hole 55 and into receiving end 43 of receptacle B, until threaded length 21 of fastener A contacts threaded section 39 of receptacle B. As demonstrated in FIG. 2, the geometry of fastener A permits fastener A to be threaded into receptacle B and tightened several turns before tapered section 17 contacts grommet 53 (if used) or hole 55.

Figure 3:
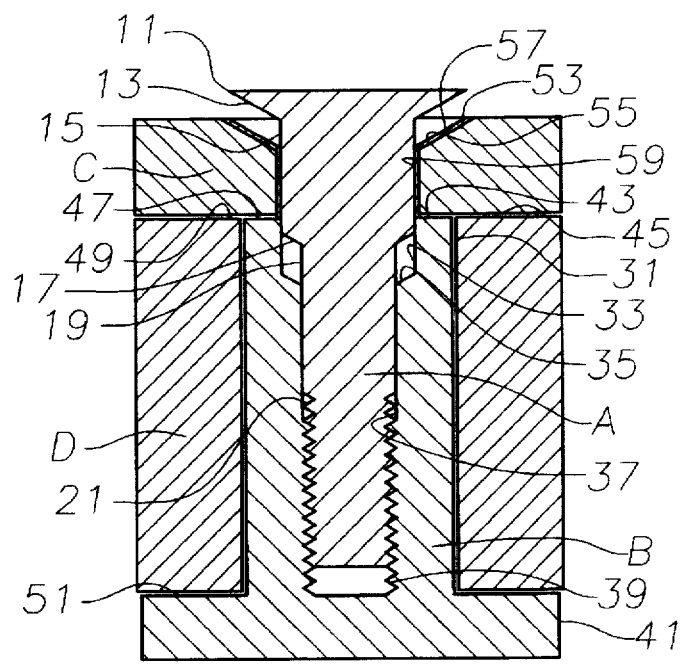
FIG. 3 is a sectional side view of the fastening system and the hardware that it is fastening and illustrates the third position of the fastening system.

Receptacle B is rigidly mounted within structure D. Further torquing of fastener A imparts a compressive load on panel C to the left, causing panel C to compress (or structure D to expand) until panel hole 55 is forced into alignment with receiving end 43 of receptacle B, as shown in FIG. 3. The length of fastener central section 19 is slightly greater than the distance from tapered section 35 to conical portion 57. This assures that when tapered section 17 begins exerting a lateral force on conical portion 57, fastener central section 19 will be in engagement with receptacle central section 37. The compressive, realigning load is created when tapered section 17 is forced down upon conical portion 57. Fastener A acts as a screw-jack when fastener central section 19 contacts receptacle central section 37. Central section 37 acts as a fulcrum when engaged as described and reduces lateral forces on threads 21 and 39. Threaded length 21 and threaded section 39 are thereby kept in alignment, maximizing panel alignment force generation capability.

Figure 4:
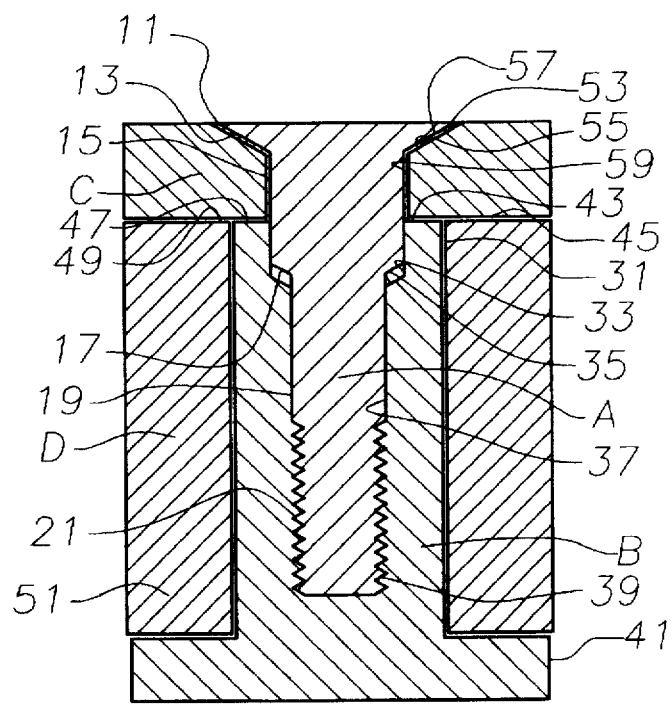
FIG. 4 is a sectional side view of the fastening system and the hardware that it is fastening and illustrates the fastening system prior to its final position of clamp-up. Slightly more torque on the fastener will achieve clamp up with no significant change in this view.

In FIG. 4, fastener A and all other fasteners (not shown) required to secure panel C are initially tightened just short of achieving clamp-up. Final torquing of fasteners follows a sequence which assures maximum load-carrying capability by panel C. When clamp-up is achieved, fastener A should be flush with panel C, while tapered section 17 on fastener A should come to rest without threat of contacting tapered section 35. The invention also facilitates gradual release of stress if the installation process described above is reversed.

The invention has a number of novel features. The receptacle has no moving parts and can be manufactured from a single piece of material. The unthreaded area in the receptacle acts as a smooth fulcrum point which translates the fastener's downward movement into the lateral force required to align the parts. The receptacle design permits a minimum of intrusion inside the structure. This system permits improved fuel sealing. Panel removal and re-installation is facilitated because a common length fastener can be used at all fastener locations. The invention is an improvement over most receptacles and domenuts since the outer diameter works in conjunction with the bonding surface of the flange to enhance structural effectiveness. Because of the bolt's and the receptacle's complimentary designs, the possibility of cross-threading or damaging the threads is virtually eliminated. Finally, if receptacle replacement is required, a tap of the proper size can be inserted into the receptacle and a torque applied and held while hot air is applied to the receptacle bond line to soften the adhesive. Once the adhesive softens, the receptacle will rotate and can be pushed out and a new receptacle can be installed.

While the invention has been shown in only one of its forms, it should be apparent to those skilled in the art that it is not so limited, but is susceptible to various changes without departing from the scope of the invention.

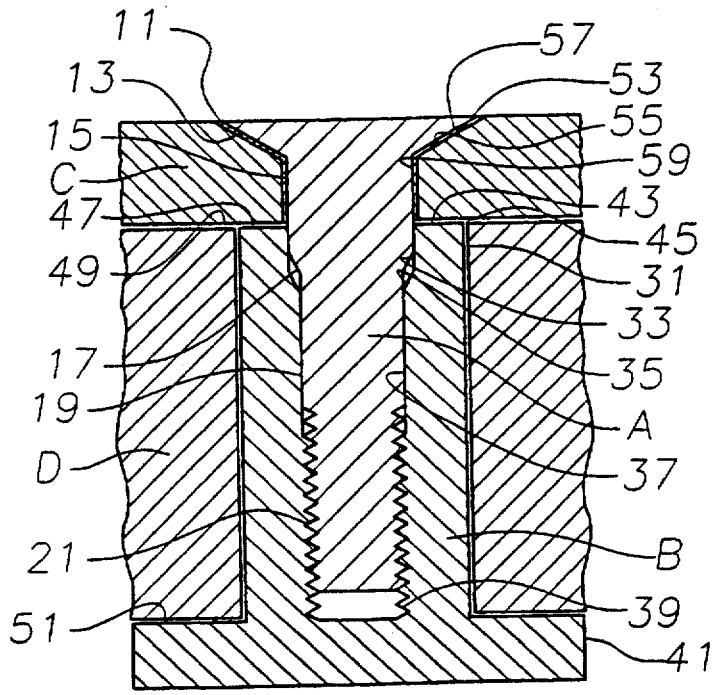

I claim:

1. In an apparatus having a panel and a substructure, the panel and substructure having holes which generally align, the hole in the panel having upper and lower portions, an improved fastener assembly comprising in combination:

a fastener having a head at one end, a smooth cylindrical upper section joining the head, the upper section having a diameter substantially equal to the diameter of the lower portion of the panel hole, a smooth cylindrical central section of smaller diameter than the upper section, an integral tapered section interconnecting the upper and central sections, and an integral threaded portion extending below the central section; and a receptacle having a sleeve which extends into the hole in the substructure, the sleeve having a bore with a smooth cylindrical upper section having a diameter substantially equal to the diameter of the upper section of the fastener, a smooth cylindrical central section substantially equal in diameter to the diameter of the central section of the fastener, and a threaded section extending below the central section.

2. The apparatus according to claim 1 wherein the head of the fastener further comprises an integral conical section interconnecting the upper section of the fastener to the head, and wherein the upper portion of the hole in the panel is conical for receiving the conical section of the fastener.

3. The apparatus according to claim 2 wherein the dimensions of the holes in the panel and the receptacle are selected such that the two cylindrical central sections begin to engage each other before the tapered section of the fastener enters the lower portion of the hole in the panel.

4. The apparatus according to claim 3 wherein engagement of the tapered section on the fastener with the upper portion of the hole in the panel while threading the fastener into the receptacle applies a lateral force on the panel if the hole in the panel is misaligned with the bore in the receptacle.

5. The apparatus according to claim 1 wherein the upper portion of the panel hole is tapered, and the head of the fastener is tapered on an underside of the head for mating engagement with the upper portion of the panel hole.

6. The apparatus according to claim 1 wherein the receptacle also comprises a flange which is adapted to be secured to a lower side of the substructure.

7. The apparatus according to claim 1 wherein the upper section of the fastener extends into the upper section of the bore in the sleeve when the fastener is fully engaged with the receptacle.

8. The apparatus according to claim 1 wherein the sleeve of the receptacle further comprises a tapered section located between the upper section and the central section.

9. The apparatus according to claim 8 wherein when the fastener is fully engaged with the receptacle, the tapered section of the fastener is axially spaced above the tapered section of the receptacle by a clearance.

10. An apparatus, comprising in combination:

a panel having a hole which has a cylindrical portion;

a substructure having a hole which generally aligns with the hole in the panel;

a fastener having a head at one end, a smooth cylindrical upper section, the upper section having a diameter substantially equal to the diameter of the cylindrical portion of the hole in the panel, a smooth cylindrical central section of smaller diameter than the upper section, an integral tapered section interconnecting the upper and central sections, and an integral threaded section extending from the central section;

a receptacle having a sleeve which extends into the substructure hole, the sleeve having a bore with a smooth cylindrical upper section having a diameter substantially equal to the diameter of the upper section of the fastener, a smooth cylindrical central section substantially equal in diameter to the diameter of the central section of the fastener, a tapered section located between the upper section and the central section, a threaded section extending below the central section, and a flange on a lower end of the sleeve; and wherein the dimensions of the holes in the panel and the receptacle are selected such that the cylindrical central section of the fastener begins to engage the cylindrical central section of the bore of the receptacle before the tapered section of the fastener contacts the cylindrical portion of the hole in the panel.

11. The apparatus according to claim 10 wherein the upper section of the fastener extends into the upper section of the bore in the sleeve when the fastener is fully engaged with the receptacle.

12. The apparatus according to claim 10 wherein when the fastener is fully engaged with the receptacle, the tapered section of the fastener is axially spaced above the tapered section of the receptacle by a clearance.

13. The apparatus according to claim 10, wherein the hole in the panel has a tapered countersunk portion located above the cylindrical portion.

14. The apparatus according to claim 10 wherein engagement of the tapered section on the fastener with the upper portion of the hole in the panel while threading the fastener into the receptacle applies a lateral force on the panel if the hole in the panel is misaligned with the bore in the receptacle.

15. A method for aligning and securing a panel to a substructure, the panel and substructure having holes which generally align, the hole in the panel having a cylindrical portion, the method comprising:

providing a fastener having a head at one end, a smooth cylindrical upper section, the upper section having a diameter substantially equal to the diameter of the cylindrical portion of the hole in the panel, a smooth cylindrical central section of smaller diameter than the upper section, an integral tapered section interconnecting the upper and central sections, and an integral threaded section extending from the central section;

installing on the substructure a receptacle having a sleeve which extends into the hole in the substructure, the sleeve having a bore with a smooth cylindrical upper section having a diameter substantially equal to the diameter of the upper section of the fastener, a smooth cylindrical central section substantially equal in diameter to the diameter of the central section of the fastener, a tapered section located between the upper section and the central section, and a threaded section extending below the central section;

inserting the fastener threaded section into the receptacle threaded section and rotating the fastener, which causes the central section of the fastener to engage the central section of the receptacle before the tapered section of the fastener contacts the cylindrical portion of the hole in the panel, and continuing to rotate the fastener to cause the tapered section on the fastener to enter the cylindrical portion of the hole in the panel, exerting a lateral force on the panel to align the hole in the panel with the bore in the receptacle.

\* \* \* \* \*

UNITED STATES PATENT AND TRADEMARK OFFICE
CERTIFICATE OF CORRECTION

PATENT NO. : 5,704,749

DATED : January 6, 1998

INVENTOR(S) : James H. Landgrebe

It is certified that error appears in the above-identified patent and that said Letters Patent is hereby corrected as shown below:

Column 1, Line 27, "is" should be --in--;

Column 1, Line 57, "The" should be --Fourth, the--;

Signed and Sealed this

Twenty-sixth Day of January, 1999

Attest:

Attesting Officer

Acting Commissioner of Patents and Trademarks

UNITED STATES PATENT AND TRADEMARK OFFICE
CERTIFICATE OF CORRECTION

PATENT NO. : 5,704,749
DATED : January 6, 1998
INVENTOR(S) : James H. Landgrebe

It is certified that error appears in the above-identified patent and that said Letters Patent is hereby corrected as shown below:

Figure 1, should appear as below:

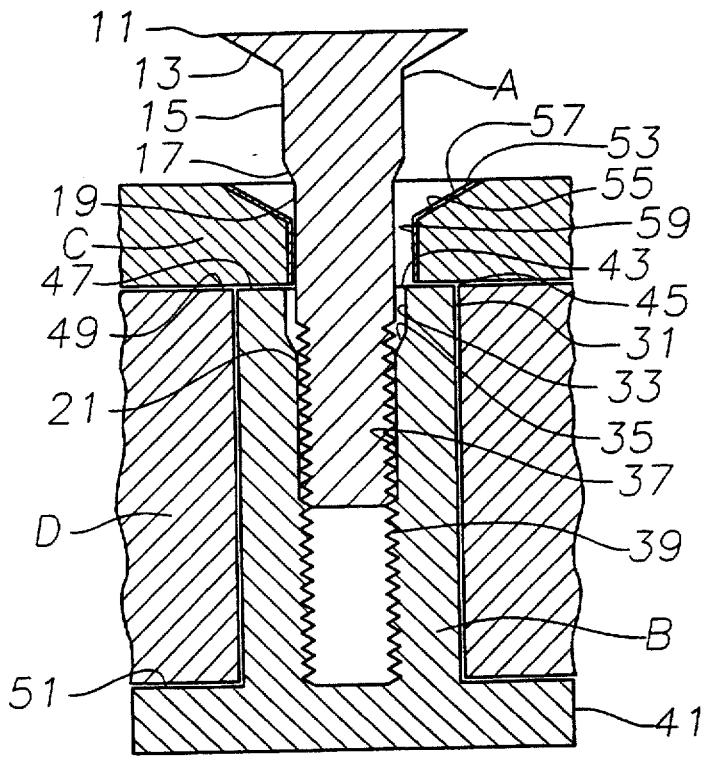

UNITED STATES PATENT AND TRADEMARK OFFICE
CERTIFICATE OF CORRECTION

PATENT NO. : 5,704,749
DATED : January 6, 1998
INVENTOR(S) : James H. Landgrebe

Figure 2:
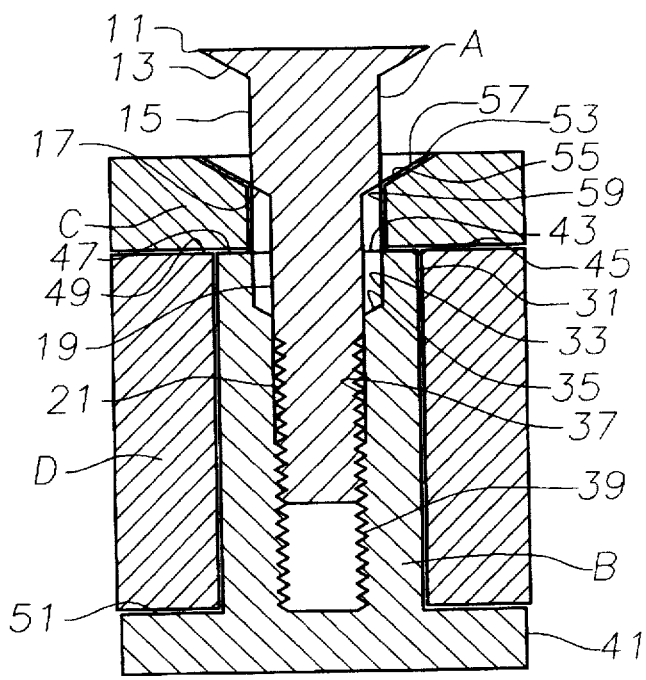
FIG. 2 is a sectional side view of the fastening system and the hardware that it is fastening and illustrates the second position of the fastening system.

It is certified that error appears in the above-identified patent and that said Letters Patent is hereby corrected as shown below:

Figure 2, should appear as below:

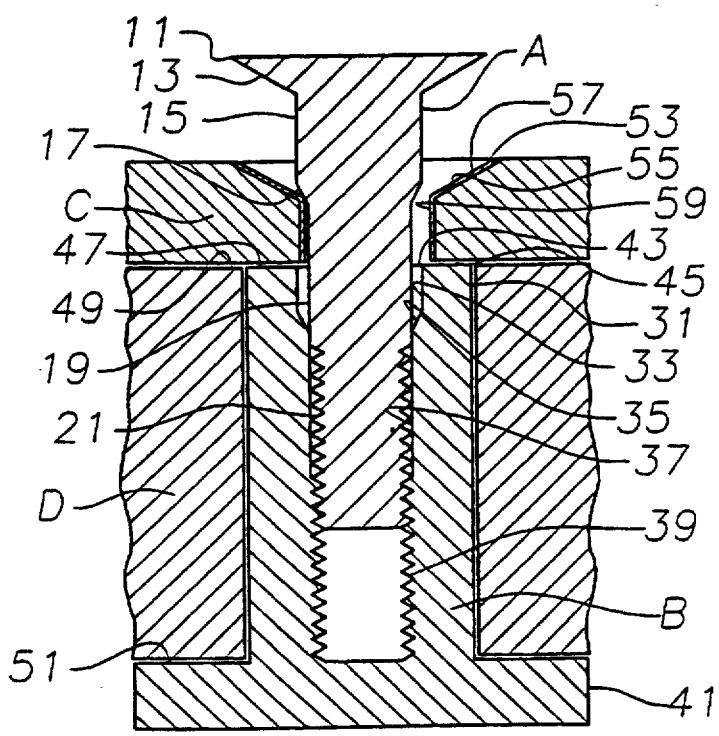

UNITED STATES PATENT AND TRADEMARK OFFICE
CERTIFICATE OF CORRECTION

PATENT NO.   : 5,704,749                           Page 4 of 5
DATED        : January 6, 1998
INVENTOR(S)  : James H. Landgrebe It is certified that error appears in the above-identified patent and that said Letters Patent is hereby corrected as shown below:

Figure 3, should appear as below:

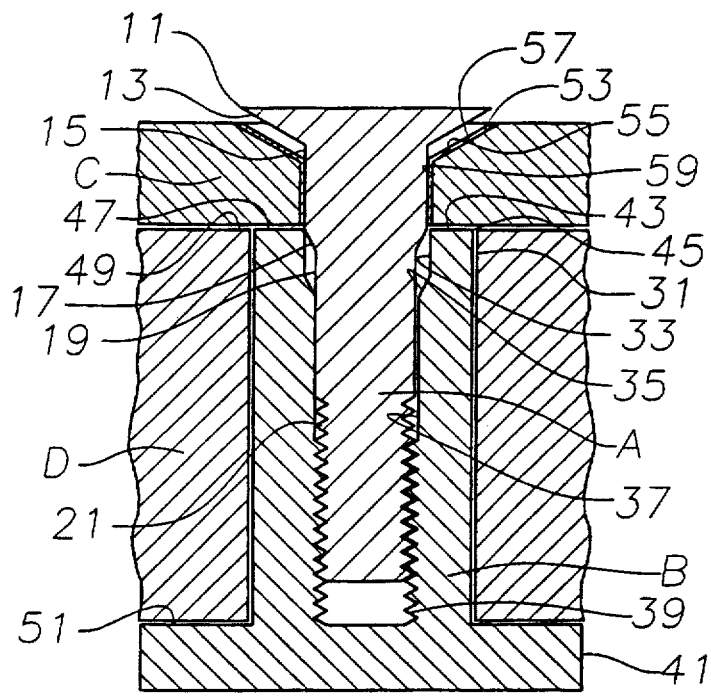

UNITED STATES PATENT AND TRADEMARK OFFICE
CERTIFICATE OF CORRECTION

PATENT NO. : 5,704,749
DATED : January 6, 1998
INVENTOR(S) : James H. Landgrebe

It is certified that error appears in the above-identified patent and that said Letters Patent is hereby corrected as shown below:

Figure 4, should appear as below: